United States Patent [19]
Henricks

[11] 3,958,918
[45] May 25, 1976

[54] METHOD FOR ELIMINATION OF FURNACE ROLL PICKUP MARKS ON SILICON CONTAINING SHEET STEEL

[75] Inventor: Arthur R. Henricks, Franklin Township, Westmoreland County, Pa.

[73] Assignee: United States Steel Corporation, Pittsburgh, Pa.

[22] Filed: Feb. 10, 1975

[21] Appl. No.: 548,715

[52] U.S. Cl. .................................. 432/2; 432/23; 432/236
[51] Int. Cl.² ................... F27B 9/04; F27D 7/00
[58] Field of Search ............... 432/2, 23, 236, 246

[56] References Cited
UNITED STATES PATENTS

| | | | |
|---|---|---|---|
| 2,753,170 | 7/1956 | Ness et al. | 432/23 |
| 3,751,195 | 8/1973 | Snow | 432/246 |

*Primary Examiner*—John J. Camby
*Attorney, Agent, or Firm*—Forest C. Sexton

[57] ABSTRACT

A process for continuous annealing silicon containing sheet steel whereby furnace roll pickup marks are eliminated, said process involving the use of furnace rolls having a silica peripheral surface and maintaining an annealing atmosphere containing hydrogen to water at a ratio of at least 5:1.

7 Claims, 2 Drawing Figures

METHOD FOR ELIMINATION OF FURNACE ROLL PICKUP MARKS ON SILICON CONTAINING SHEET STEEL

BACKGROUND OF THE INVENTION

Steel strip can be annealed in either coil form, commonly referred to as "batch annealing" or by passing the uncoiled strip through a continuous annealing furnace. The present invention addresses itself to the continuous annealing of steel strip. Continuous annealing furnaces are of two types, namely, vertical or horizontal. Vertical or horizontal refers to the strip alignment in the furnace during the heat treatment operation. The major affect on product quality in comparing the two types is the capability of the horizontal furnace to produce a stress-free strip product.

A typical horizontal continuous heat-treating furnace roller hearth line consists of an entry section including coil-payoff reels, strip welder, horizontal looping equipment, electrolytic cleaning, scrubbing and drying units. The entry section is joined to a contiguous horizontal heat-treating section consisting of a gas-fired heating zone (72 feet long), and an electrically-heated holding zone (600 feet long), a controlled cooling zone (200 feet long), and a jet-cooling zone (90 feet long). The dimensions cited pertain to a typical unit now in operation. The dimensions are stated to illustrate the comparative lengths of the various elements of a typical horizontal continuous annealing furnace. These dimensions may vary as desired or necessary. The exit section of the furnace consists of a horizontal looping unit and tension reel. The strip is supported as it passes through the heat-treating section of the furnace in catenary fashion by individually-motor-driven alloy steel rolls.

Although the above described continuous annealing practice is quite suitable for most grades of steel, problems are encountered in continuous annealing silicon containing electrical sheet steels, which must be annealed at relatively high temperatures, i.e. above 1,400°F, in decarburizing atmospheres. This combination of high temperatures and decarburizing atmospheres in continuous annealing furnaces frequently causes surface damage on the steel due to roll pickup marking. That is, during such annealing practices, oxidizing conditions must be maintained in the atmosphere to remove carbon from the steel. Carbon is removed by oxidation in the form of CO and $CO_2$, which are gaseous phases. At the same time, surface iron and silicon are oxidized to solid oxide forms which are retained on the steel surface. During the continuous annealing through the roller hearth, these surface oxide particles are frequently "picked-up" by the roll surface, i.e. transferred from the steel surface to the roll surface. This build-up of oxides on the roll surfaces will then cause indentations or other undesirable marks on the strip surfaces subsequently passing over the rolls.

To obviate the above problem, several developments have been made, which are primarily addressed to providing furnace rolls having refractory surfaces which tends to resist oxide pickup. For example, U.S. Pat. No. 3,751,195, Snow, discloses a roll having a surface of sinter-banded fused silica. Although such rolls have achieved a moderate degree of success, they have not completely eliminated the problem, particularly where the hot sheet steel wraps around a roll under tension. In commercial facilities where such silicon containing steel strip is processing, it is still necessary therefore, to employ practices for periodically removing oxide pickup from the rolls, even when refractory roll surfaces are used.

A primary object of this invention is to provide a process for continuous annealing silicon containing sheet steel whereby all roll pickup is virtually eliminated.

Another object of this invention is to provide a simple method for eliminating furnace roll pickup during continuous annealing of silicon containing sheet steel.

A further object of this invention is to provide a slightly modified process for continuous annealing silicon containing sheet steel whereby all roll pickup is virtually eliminated by providing a decarburizing atmosphere which will cause only surface silica to be formed on the steel which will not stick to rolls having a silica surface.

DESCRIPTION OF THE PREFERRED EMBODIMENT

The final continuous anneal of silicon containing electrical sheet steel is performed at relatively high temperatures so as to effect a substantially complete recrystallization. During this anneal it is also necessary to maintain a decarburizing atmosphere to assure a low carbon content in the steel so as to maximize magnetic properties. A normal operating practice for such an anneal is to heat the sheet steel to a temperature in the range 1,400° to 1,650°F in a decarburizing atmosphere having a minimum dew point of about 70°F, i.e. 2.3 volume percent water. Typically, a hydrogen-water-nitrogen mixture is provided containing about 10 to 20% hydrogen with a hydrogen to water ratio of from 3:1 to 5:1. The balance thereof is nitrogen which is considered to be inert.

In accordance with more recent developments, the continuous annealing furnaces for effecting the above anneal are provided with refractory surfaces, such as fused silica, in order to minimize roll pickup. Despite this effort, there is still some roll pickup, and hence means must be employed to periodically remove the oxide pickup from the refractory roll surfaces.

In accordance with the process of this invention the above discussed roll pickup problem is virtually eliminated by utilizing, in combination, furnace rolls having a silica surface, and providing a decarburizing furnace atmosphere that will not form iron oxides on the steel surface. Accordingly, it has been discovered that in using furnace rolls having a silica surface, such as those described in U.S. Pat. No. 3,751,195 (supra) the oxides which tend to stick thereto are those which are dissimilar, i.e. oxides of iron, while silica on the steel surface will not stick or transfer to the silica roll surfaces. Indeed, prior art annealing practices will cause the formation of fayalite ($FeO$—$SiO_2$) and possibly even wustite (FeO) on the steel surface in addition to silica ($SiO_2$). A study of the oxide pickup on silica roll surfaces has shown that the oxides which stick thereto are primarily the iron oxides, fayalite and wustite, and not the silica. It can be concluded therefore that if the furnace atmosphere can be adjusted so that iron oxides would not be formed on the steel, then the roll pickup problem can be eliminated, provided of course, that the furnace rolls have an essentially pure silica surface.

Figure 1:
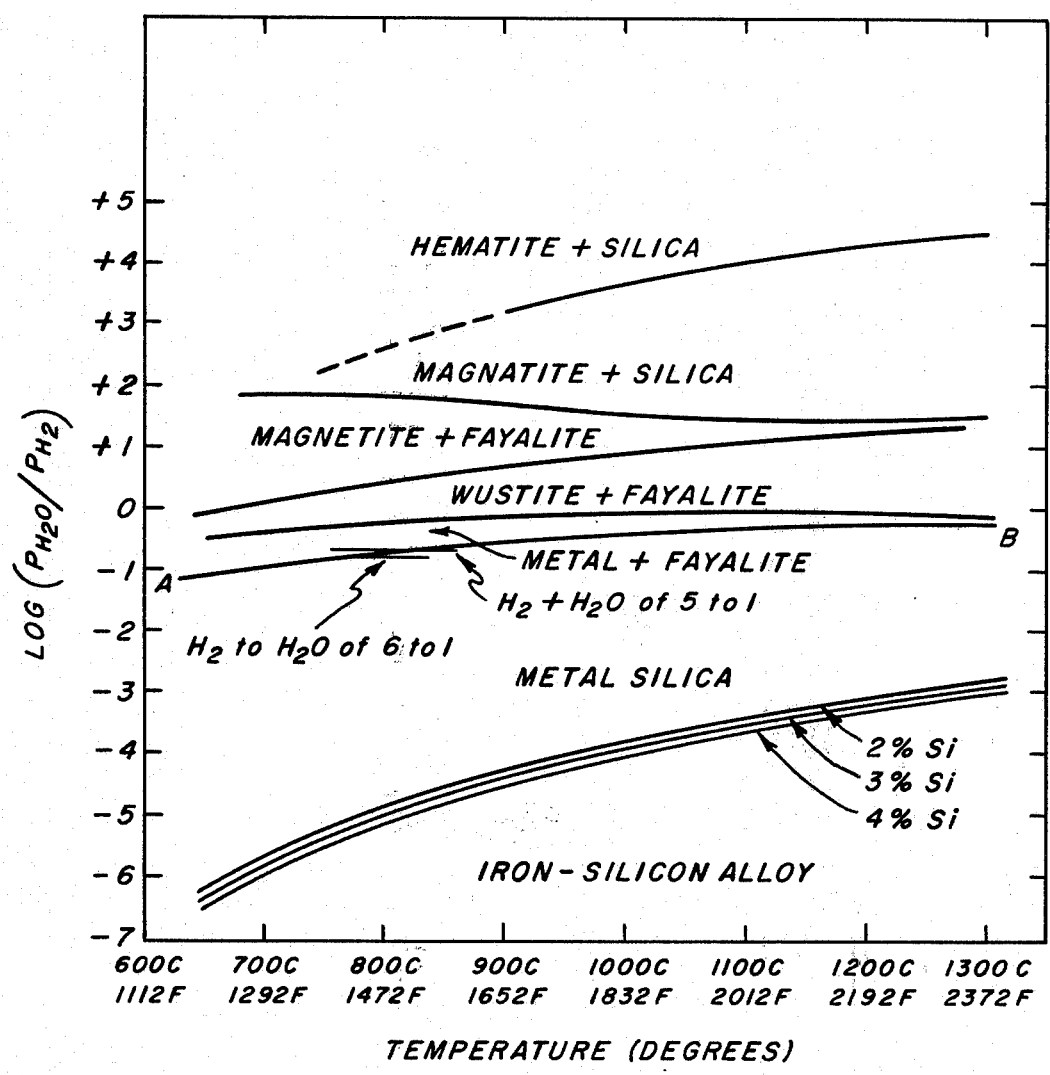
FIG. 1 is a graph showing the stable phases in the iron-silicon-oxygen system as a function of the equilibrium water-hydrogen ratio.

A study of the stable phases in the iron-silicon-oxygen system as a function of equilibrium water-hydrogen ratio has shown that iron oxide cannot exist in equilibrium, at temperatures of from 1,400° to 1,650°F, in an atmosphere having a hydrogen to water ratio in excess of about 5:1. This is shown by the equilibrium diagram in FIG. 1. With reference to FIG. 1, the line A-B represents the phase boundary below which iron oxides cannot exist in equilibrium in the system. That is, at higher hydrogen to water ratios below the line A-B, only metal and silica can exist in equilibrium. It is seen that as the hydrogen to water ratio is reduced to a value above the line A-B, then only metal and fayalite ($FeO.SiO_2$) can exist in equilibrium. As the water concentration of the atmosphere is increased even further, higher oxide forms of iron will exist in equilibrium. For example at a 1:1 ratio of hydrogen and water, wustite (FeO) and fayalite co-exist in equilibrium. At even higher water concentrations, magnetite and hematite will exist in equilibrium, as shown.

In the annealing of a silicon-containing steel, the oxides are formed during the anneal by the atmosphere itself, and therefore, closely adhere to equilibrium conditions as depicted in FIG. 1. Hence, the surface oxides on the silicon-containing steel can be controlled by regulating the hydrogen to water ratio as shown in FIG. 1. It is seen therefore that if one is to anneal a silicon-containing steel at a temperature of 1,400°F, he can indeed avoid the formation of iron oxides on the steel surface by providing a hydrogen to water ratio of at least 6:1. Clearly, the ratio of 6:1 should be suitable for any temperature within the usual annealing range of 1,400° to 1,650°F. On the other hand, as the annealing temperature is increased, the critical hydrogen to water ratio diminishes somewhat. For example, at 1,472°F (800°C) it is seen that the critical ratio for preventing oxidation of iron falls to about 5:1. Although it can be seen that even lower ratios than 5:1 may be suitable at even higher temperatures, it is preferred, in the practice of this invention, to maintain a minimum hydrogen to water ratio of 5:1 and preferably 6:1 so as to provide a safety margin and a ratio suitable to prevent iron oxidation at the lower temperatures of 1,400° to 1,475°F while the steel is being heated.

In its broadest aspect therefore, the practice of this invention involves the continuous annealing of silicon-containing steel at a temperature of from 1,400° to 1,650°F in a decarburizing atmosphere having a hydrogen to water ratio below the line A-B in FIG. 1, or at a ratio of at least 5:1 and preferably 6:1. Although the line A-B in FIG. 1 clearly defines the minimum limit for the hydrogen to water ratio, there is no clearly definable upper limit. Although it is obvious that a pure hydrogen atmosphere would serve to prevent the formation of iron oxides, such an atmosphere would not be decarburizing as is essential for processing electrical sheet steels. To be decarburizing, there must of course be some water in the atmosphere. From a purely practical approach therefore, it has been determined that the hydrogen to water ratio should be within the range 5:1 to 8:1, and preferably at about 6:1. Although there is no criticality at the 8:1 ratio, this maximum limit was arbitrarily selected to satisfy optimum commercial operations for decarburizing anneals within the range 1,400° to about 1,650°F. That is to say, although ratios in excess of 8:1 would be operable, such atmospheres would be more costly due to the higher hydrogen costs and would be less effective as a decarburizing atmosphere. Specifically, hydrogen to water ratio in excess of 8:1 would so dilute the water content of the atmosphere as to require a substantial increase in the furnace holding time, i.e. decrease in line speed, in order to effect the desired decarburization.

Figure 2:
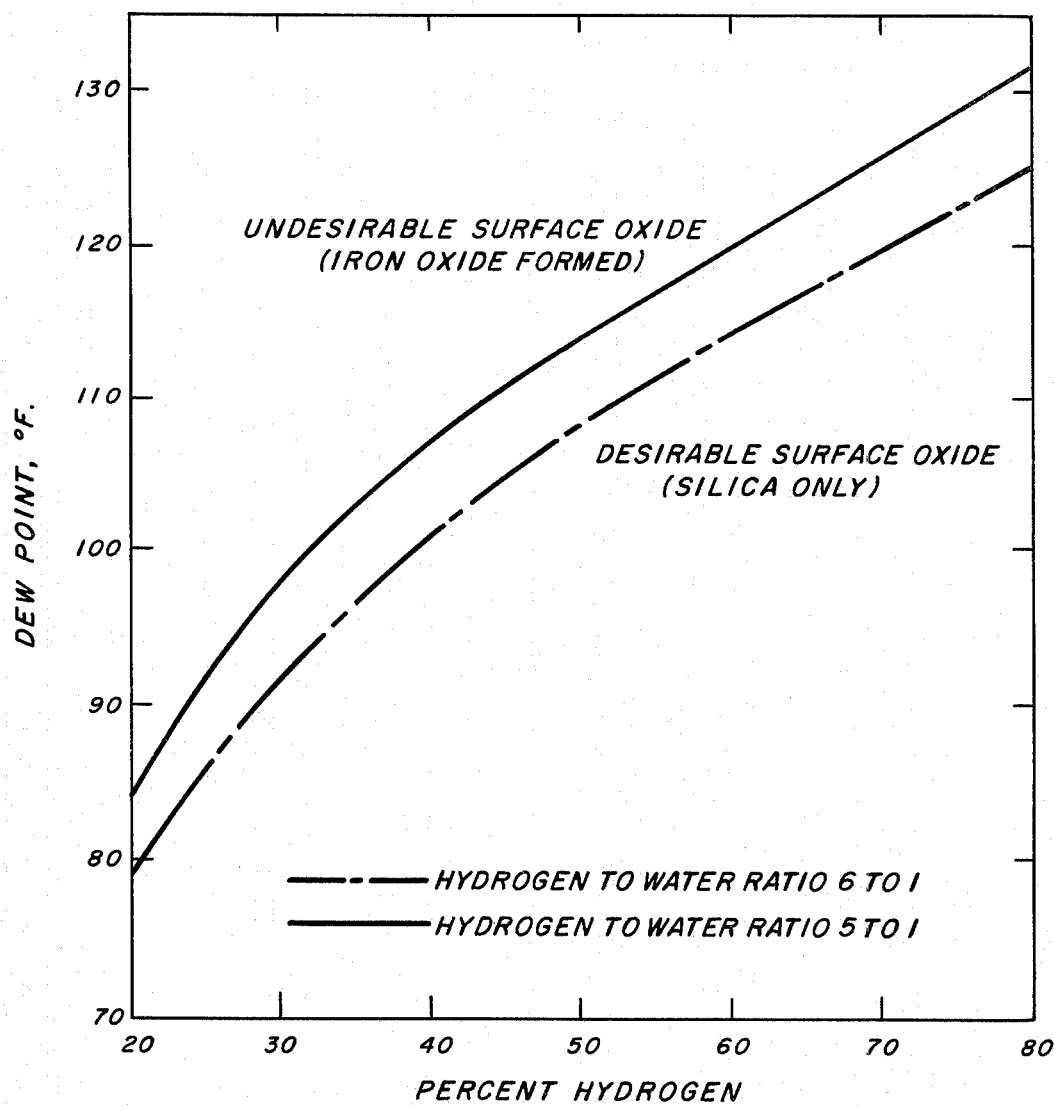
FIG. 2 is a graph showing the relationship of surface oxide to furnace atmosphere in a silicon-containing steel during annealing.

In view of the above discussion, it is apparent that for the successful commercial practice of this invention, it is not only essential that the minimum hydrogen to water ratio be maintained, but it is also necessary that sufficient water be present in the atmosphere to assure good decarburizing characteristics. Since the minimum hydrogen to water ratio of 5:1 represents a greater relative concentration of hydrogen as compared to prior art practices, such a relative increase in hydrogen would tend to diminish the atmosphre's decarburizing characteristics. As was noted above, hydrogen to water ratios in excess of 8:1 provides too much hydrogen with respect to water to yield a good decarburizing atmosphere. Indeed, even at conventional dew point levels of 75°F (i.e. 3% water) a 6:1 hydrogen to water ratio (i.e. 18% hydrogen) will provide a bit too much hydrogen to render good decarburizing characteristics. Therefore, in order to maintain good decarburizing characteristics at a hydrogen to water ratio of 5:1 or 6:1, it is necessary to operate at higher than usual concentrations of both hydrogen and water. Specifically, in the practice of this invention, at least about 20% hydrogen should be provided to assure sufficient water, at a 6:1 ratio, to yield good decarburizing characteristics, i.e. at least 3.3% water to provide a dew point of about 80°F. FIG. 2 illustrates the necessary dew point at hydrogen contents of from 20 to 80%.

In the preceeding discussion concerning amounts of hydrogen and water in the furnace atmosphere, it is obvious that the total amounts do not add up to 100 percent. As in prior art practices therefore, the balance of the atmosphere should be a relatively inert gas such as nitrogen, or any other gas which will not react with the steel, hydrogen or water and will not depress the dew point.

Although it is believed that the above description adequately describes the invention, certain problems may arise in commercial applications of the invention which may require a modified practice. Specifically, within the annealing temperatures recited above, i.e. 1,400° to 1,650°F, the invention should be practiced as taught. It should be noted however, that some commercial operations may heat the steel to a temperature within the range 1,650° to 2,000°F following the decarburizing anneal for the purpose of effecting grain growth. This may be done in a separate subsequent operation, or as an added final treatment in a single pass through a continuous annealing furnace, i.e. heating the steel through the temperature range 1,400° to 1,650°F (to anneal and decarburize) to a final temperature in the range 1,650° to 2,000°F (to effect grain growth). If the steel is to be subjected to temperatures in excess of 1,650°F, it has been found preferable at such temperatures to maintain a greater hydrogen to water ratio than 8:1 in order to prevent iron oxidation on the steel surface and accordingly roll pick-up marking. Specifically, ratios on the order of 20:1 to 30:1 may be necessary to avoid iron oxidation at temperatures approaching 2,000°F. Admittedly, such low water concentrations would render the atmosphere very weak as a decarburizing atmosphere. This should not be a problem however, as the steel would be substantially decarburized while it is heated through the lower temperature range, i.e. 1,400° to 1,650°F. Hence at the higher temperatures of 1,650° to 2,000°F, where grain growth is the objective, it is not necessary to have a decarburizing atmosphere.

The operability of the subject invention has been fully demonstrated in a commercial operation. Specifically, a commercial operation for annealing non-oriented electrical sheet steels containing from 2 to 4% silicon had been processed through a roller-hearth furnace having a fused silica surface on the furnace rolls. Prior to this invention, the annealing atmospheres used consisted of from 10 to 20% hydrogen with a hydrogen to water ratio of 3:1 to 5:1, at an aim temperature of 1,475°F. During such processing, sufficient oxide materials were picked-up by the furnace roll surfaces, so that after an average of 6.6 turns (i.e. one turn = an 8 hour shift), processing had to be discontinued so that the furnace roll surfaces could be cleaned of oxide pickup. After this invention was conceived, it was employed on this same commercial facility. This practice sought to maintain a hydrogen content of about 50%, and sought to maintain a hydrogen to water ratio of about 6:1, but in no event going below 5:1. The graph shown in FIG. 2 was constructed and used by the furnace operators who tried to maintain a furnace atmosphere as near as possible to the broken line representing a 6:1 ratio. Utilizing this practice, the facility was operated continuously for 3 months with complete freedom from roll pickup problems. After the three-month run, the facility was shut down for reasons other than roll pickup problems. Indeed even after the three month continuous operation, the furnace roll surfaces were relatively clean.

I claim:

1. A process for continuous annealing a silicon containing sheet steel whereby furnace roll pickup is substantially eliminated, the process comprising continuously annealing said steel at a temperature of from 1,400° to 1,650°F in a furnace provided with furnace rolls having a silica peripheral surface, and maintaining in the furnace a decarburizing atmosphere containing hydrogen and water at a ratio sufficient to cause the formation of only silica on the steel surface.

2. A process according to claim 1 in which said decarburizing atmosphere contains a hydrogen to water ratio of at least 5:1.

3. A process according to claim 1 in which said decarburizing atmosphere contains a hydrogen to water ratio within the range 5:1 to 8:1.

4. A process according to claim 1 in which said decarburizing atmosphere contains a hydrogen to water ratio of about 6:1.

5. A process according to claim 3 in which said decarburizing atmosphere contains from 20 to 80% hydrogen.

6. A process according to claim 1 in which said steel is subsequently heated to a temperature within the range 1,650° to 2,000°F in a second atmosphere containing a hydrogen to water ratio in excess of 8:1 to effect grain growth.

7. A process according to claim 6 in which said second atmosphere contains a hydrogen to water ratio within the range 8:1 to 30:1.

* * * * *